US011370352B2

(12) United States Patent
Roels et al.

(10) Patent No.: US 11,370,352 B2
(45) Date of Patent: Jun. 28, 2022

(54) LUMINOUS MATRIX-ARRAY MONOLITHIC MOTOR-VEHICLE DEVICE FOR WRITING ON THE GROUND

(71) Applicant: VALEO VISION, Bobigny (FR)

(72) Inventors: Sebastien Roels, Bobigny (FR); Marie Pellarin, Bobigny (FR); Sophie Clade, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/044,708

(22) PCT Filed: Apr. 3, 2019

(86) PCT No.: PCT/EP2019/058439
§ 371 (c)(1),
(2) Date: Oct. 28, 2020

(87) PCT Pub. No.: WO2019/193074
PCT Pub. Date: Oct. 10, 2019

(65) Prior Publication Data
US 2021/0070219 A1    Mar. 11, 2021

(30) Foreign Application Priority Data
Apr. 3, 2018   (FR) ...................................... 1852899

(51) Int. Cl.
*B60Q 1/18*       (2006.01)
*F21S 41/663*    (2018.01)
(Continued)

(52) U.S. Cl.
CPC .............. *B60Q 1/18* (2013.01); *F21S 41/143* (2018.01); *F21S 41/663* (2018.01); *F21S 41/16* (2018.01);
(Continued)

(58) Field of Classification Search
None
See application file for complete search history.

(56) References Cited

U.S. PATENT DOCUMENTS

2008/0239746 A1* 10/2008 Wuller ................. F21S 41/143
362/538
2008/0316759 A1* 12/2008 Valcamp ................ F21S 41/24
362/507
(Continued)

FOREIGN PATENT DOCUMENTS

EP      2772682 A2    9/2014
EP      2813395 A1    12/2014
(Continued)

OTHER PUBLICATIONS

European Patent Office, International Search Report and Written Opinion of International Application No. PCT/EP2019/058439, dated Jun. 6, 2019.

*Primary Examiner* — Elmito Breval
(74) *Attorney, Agent, or Firm* — Valeo Vision (57) ABSTRACT

The present invention proposes a lighting device for a motor vehicle comprising a first module that projects a first pixelated high beam, a second module that projects a second pixelated writing beam onto the road, and a third module that projects a third low beam cut-off. The first, second and third modules are arranged such that the first and second beams overlap at least partially vertically; and the second and third beams overlap at least partially vertically.

11 Claims, 3 Drawing Sheets

(51) Int. Cl.
*F21S 41/143* (2018.01)
*F21Y 115/10* (2016.01)
*F21S 41/16* (2018.01)
*F21W 107/10* (2018.01)

(52) U.S. Cl.
CPC ...... *F21W 2107/10* (2018.01); *F21Y 2115/10* (2016.08)

(56) References Cited

U.S. PATENT DOCUMENTS

| | | | |
|---|---|---|---|
| 2010/0264824 A1* | 10/2010 | Gotz | F21S 41/153 315/82 |
| 2011/0235349 A1* | 9/2011 | Nakaya | F21S 41/151 362/466 |
| 2015/0377442 A1 | 12/2015 | Bhakta et al. | |
| 2018/0010755 A1 | 1/2018 | Park et al. | |

FOREIGN PATENT DOCUMENTS

| | | |
|---|---|---|
| JP | 2017224468 A | 12/2017 |
| WO | 2013099144 A1 | 7/2013 |

* cited by examiner

LUMINOUS MATRIX-ARRAY MONOLITHIC MOTOR-VEHICLE DEVICE FOR WRITING ON THE GROUND

CROSS-REFERENCE TO RELATED APPLICATIONS

This application is filed under 35 U.S.C. § 371 U.S. National Phase of International Application No. PCT/EP2019/058439 filed Apr. 3, 2019 (published as WO2019193074), which claims foreign priority benefit to French application No. 1852899 filed on Apr. 3, 2018, the disclosures of which are incorporated by reference herein in their entirety.

TECHNICAL FIELD

The invention relates to the technical field of motor vehicle lighting and signalling, more particularly to lighting devices for writing information intended for road users, including pedestrians, on the ground.

BACKGROUND

The projection of a light beam by a motor vehicle lighting device traditionally makes it possible to illuminate the road with overall lighting and thus to increase visibility in the event of darkness, for example at night. This allows safe driving of the vehicle.

These motor vehicle lighting devices provide the traditional lighting and/or signaling functions, and in particular a high beam function, also denoted HB, and a low beam function, denoted LB. These HB and LB functions are regulated, for example by the ECE regulations. In particular, the regulations stipulate that the light beam of the LB function must comprise a cut-off line comprising an oblique area; the upper part of the oblique area is called "shoulder" and the lower part of the oblique area is called "kink". Little or no light may be emitted above the cut-off line. Light is emitted below the cut-off line.

Recent developments in the field of these lighting devices have made it possible to bestow additional functions on them. It is thus possible to produce a pixelated light beam to achieve this lighting. With such a light beam, the lighting device is also able to perform localized lighting functions, for example project a pattern onto the scene. Such functions are known from the field of adaptive lighting or ADB, acronym for "adaptive driving beam". Glare-free lighting is known, for example, consisting for example in darkening an area corresponding to an oncoming vehicle so as not to dazzle this other user. Also known is the bend lighting function or DBL (acronym for "dynamic bending light"), which modifies the illuminated area of the scene when the vehicle has a direction that is not straight, for example on a bend or at a road intersection.

In order to obtain a pixelated beam that complies with this cut-off line, lighting devices comprising a laser source, a matrix array of micromirrors for scanning the field to be illuminated and for writing on the ground and a wavelength conversion device for obtaining white light through additive synthesis for lighting are known. These devices are however very expensive. It would furthermore be difficult to increase the number of laser sources since it is highly complicated to combine the beams from various laser diodes so as to have a sufficiently small beam diameter both at the scanning system and at the wavelength conversion device.

The invention therefore aims to obtain a lighting device that provides new layout and design possibilities, and that is compatible with a good compromise between lighting performance, in particular making it possible to double the light intensity at the center of the high beam function, while still allowing information to be written on the ground, and having good heat dissipation.

SUMMARY

The present invention proposes a lighting device for a motor vehicle, comprising a first module able to project a first pixelated, partial or full, high beam, a second module able to project a second pixelated road writing beam, and a third module able to project a third cut-off (low) beam. The first, second and third modules are arranged such that the first and second beams overlap at least partially vertically; and the second and third beams overlap at least partially vertically.

A Module able to produce a pixelated beam is understood to mean in particular a module comprising:
- a pixelated light source comprising a plurality of elementary emitters arranged in a matrix array, each of the elementary emitters being able to be activated selectively so as to emit an elementary light beam; and
- an optical projection element associated with said pixelated light source for projecting each of said elementary light beams in the form of a pixel, the set of pixels forming said pixelated beam.

Advantageously, the pixelated light source is associated with a control unit able to selectively control the light intensity of each of the pixels of the pixelated beam, and in particular to selectively activate or deactivate each of the pixels of said pixelated beam, on the basis of control instructions received by said control unit.

Advantageously, the optical projection element is arranged such that the pixelated beam has a vertical amplitude of at least 5° and a horizontal amplitude of at least 5°. These horizontal and vertical amplitudes make it possible to ensure that the pixelated beam is projected onto an area of the road that is large enough to perform writing functions on the road by projecting a pattern in this pixelated beam, and in particular ground marking display functions, driving assistance functions and GPS information projection functions, or even adaptive lighting functions that require pixelation of the lighting beam and in particular glare-free high beam lighting functions or dynamic bending lighting functions. 7 The optical projection element may thus comprise one or a combination of the following optical components: lens, reflector, guide, collimator, prism.

Where appropriate, the pixelated light source may comprise at least 20 columns and at least 20 rows of elementary emitters, in particular at least 32 rows and columns of elementary emitters.

These minimum numbers of columns and rows of elementary emitters, in combination with the abovementioned vertical and horizontal amplitudes, make it possible to obtain, for each of the elementary light beams, once they have been projected by the optical projection element, an angular aperture of less than 0.5°, or even less than 0.3°. A minimal resolution of the pixelated beam is thus obtained when it is projected onto the road such that satisfactory perception of said pattern projected in the pixelated beam is guaranteed to a road user and/or to the driver of the vehicle equipped in this way.

Advantageously, the elementary emitters and the optical projection element are arranged such that two neighboring pixels, that is to say two adjacent pixels on one and the same row or on one and the same column, are contiguous, that is to say that their adjacent edges are coincident.

Pixelated light source is also understood to mean the assembly of at least one light source formed of at least one light-emitting diode emitting light and a matrix array of micromirrors (also known by the acronym DMD, for Digital Micromirror Device), which directs the light rays originating from said at least one light source by reflection toward an optical projection element. Where appropriate, an optical element makes it possible to collect the rays from the at least one light source in order to concentrate them and to direct them toward the surface of the matrix array of micromirrors. Each micromirror is able to pivot between two fixed positions, a first position in which the light rays are reflected toward the optical projection element, and a second position in which the light rays are reflected in a direction other than the optical projection element. The two fixed positions are oriented in the same way for all of the micromirrors and form, with respect to a support reference plane of the matrix array of micromirrors, an angle $\alpha$ characteristic of the matrix array of micromirrors, defined in the specifications thereof. This angle $\alpha$ is generally less than 20° and usually has a value of about 12°. With each micromirror reflecting a small portion of the light rays incident on the micromirror matrix array, actuating and driving the position change thus makes it possible to modify the shape of the beam emitted by the optical projection element, and ultimately onto the road.

Pixelated light source is also understood to mean a laser scanning system in which a laser source emits a laser beam toward scanners that are configured so as to scan, with the laser beam, the surface of a wavelength converter element, which surface is imaged by an optical projection element. The scanning of the beam is brought about by the scanners at a speed high enough that the human eye does not perceive its movement in the projected image. The synchronized driving of the activation of the laser source and of the scanning motion of the beam makes it possible to generate a pixelated light beam. In this case, the scanners are a mobile micromirror for scanning the surface of the wavelength converter element through reflection of the laser beam. The micromirrors mentioned as scanners are for example of MEMS (microelectromechanical system) type. However, the invention is in no way limited to this scanning means, and may use other types of scanner, such as a series of mirrors arranged on a rotary element, the rotation of the element causing the transmission surface to be scanned by the laser beam.

Pixelated light source is also understood to mean an electroluminescent source (called "solid-state light source"). The electroluminescent source comprises a plurality of elementary elements called electroluminescent elements, arranged in a matrix array in at least two columns and two rows. Examples of electroluminescent elements include the light-emitting diode or LED, the organic light-emitting diode or OLED, or the polymer light-emitting diode or PLED, or even the micro-LED.

Preferably, the electroluminescent source comprises at least one monolithic matrix array of electroluminescent elements, also called a monolithic matrix array. In a monolithic matrix array, the electroluminescent elements are grown from a common substrate and are electrically connected so as to be able to be activated selectively, individually or by subset of electroluminescent elements. The substrate may be made predominantly of semiconductor material. The substrate may comprise one or more further materials, for example non-semiconductor materials. Each electroluminescent element or group of electroluminescent elements may thus form a luminous pixel and is able to emit light when its or their material is supplied with electricity. The configuration of such a monolithic matrix array makes it possible to arrange selectively activatable pixels very close to each other, in comparison with conventional light-emitting diodes that are intended to be soldered onto printed circuit boards. The monolithic matrix array within the meaning of the invention comprises electroluminescent elements a main dimension of elongation of which, specifically the height, is substantially perpendicular to a common substrate, this height being at most equal to one micrometer.

Advantageously, the monolithic matrix array or matrix arrays able to emit light rays may be coupled to a control unit for controlling the light emission of the pixelated source. The control unit may thus control (this may also be called drive) the generation and/or the projection of a pixelated light beam by the lighting device. The control unit may be integrated into the lighting device. The control unit may be mounted on one or more of the matrix arrays, the assembly thus forming a lighting module. The control unit may comprise a central processing unit coupled to a memory on which there is stored a computer program that comprises instructions allowing the processor to perform steps that generate signals for controlling the light source. The control unit may thus for example individually control the light emission of each pixel of a matrix array. Furthermore, the luminance obtained by the plurality of electroluminescent elements is at least 60 $Cd/mm^2$, preferably at least 80 $Cd/mm^2$.

The control unit may form an electronic device able to control the electroluminescent elements. The control unit may be an integrated circuit. An integrated circuit, also called an electronic chip, is an electronic component that reproduces one or more electronic functions and is able to integrate several types of basic electronic component, for example in a limited volume (i.e. on a wafer). This makes the circuit easy to implement. The integrated circuit may be for example an ASIC or an ASSP. An ASIC (acronym for "Application-Specific Integrated Circuit") is an integrated circuit developed for at least one specific application (that is to say for a client). An ASIC is therefore a specialized (microelectronic) integrated circuit. Generally speaking, it groups together a large number of unique or tailored functions. An ASSP (acronym for "Application-Specific Standard Product") is an integrated (microelectronic) electronic circuit that groups together a large number of functions in order to satisfy a generally standardized application. An ASIC is designed for a more particular (specific) need than an ASSP. The monolithic matrix arrays are supplied with electricity via the electronic device, which is itself supplied with electricity using for example at least one connector connecting it to an electricity source. The electricity source may be internal or external to the device according to the invention. The electronic device supplies electricity to the light source. The electronic device is thus able to control the light source.

According to the invention, the light source comprises at least one monolithic matrix array whose electroluminescent elements project from a common substrate from which they have respectively grown. Various arrangements of electroluminescent elements may meet this definition of a monolithic matrix array, provided that the electroluminescent elements have one of their main dimensions of elongation substantially perpendicular to a common substrate and that the spacing between the pixels, formed by one or more electroluminescent elements grouped together electrically, is small in comparison with the spacings that are imposed in known arrangements of flat square chips soldered to a printed circuit board.

In particular, the light source according to one aspect of the invention may comprise, as will be described in more detail below, a plurality of electroluminescent elements that are distinct from the others and that are grown individually from the substrate, by being electrically connected so as to be able to be activated selectively, where appropriate by sub-assemblies within which rods are able to be activated simultaneously.

According to one embodiment that is not shown, the monolithic matrix array comprises a plurality of electroluminescent elements, of submillimeter dimensions, which are arranged projecting from a substrate so as to form rods with a hexagonal cross section. The electroluminescent rods extend parallel to the optical axis of the lighting module when the light source is in position in the housing.

These electroluminescent rods are grouped together, in particular by electrical connections specific to each assembly, in a plurality of portions able to be activated selectively. The electroluminescent rods originate on a first face of a substrate. Each electroluminescent rod, formed in this case using gallium nitride (GaN), extends perpendicularly, or substantially perpendicularly, projecting the substrate, in this case produced from silicon, with other materials, such as silicon carbide, being able to be used without departing from the context of the invention. By way of example, the electroluminescent rods could be produced from an alloy of aluminum nitride and of gallium nitride (AlGaN), or from an alloy of aluminum, indium and gallium phosphides (AlInGaP). Each electroluminescent rod extends along an axis of elongation defining its height, the base of each rod being arranged in a plane of the upper face of the substrate.

The electroluminescent rods of one and the same monolithic matrix array advantageously have the same shape and the same dimensions. They are each delimited by an end face and by a circumferential wall that extends along the axis of elongation of the rod. When the electroluminescent rods are doped and subjected to polarization, the resulting light at the output of the semiconductor source is emitted mainly from the circumferential wall, it being understood that light rays may also exit from the end face. The result of this is that each electroluminescent rod acts as a single light-emitting diode and that the luminance of this source is improved firstly by the density of the electroluminescent rods that are present and secondly by the size of the lighting surface defined by the circumferential wall and that therefore extends over the entire perimeter and the entire height of the rod. The height of a rod may be between 2 and 10 $\mu m$, preferably 8 $\mu m$; the largest dimension of the end face of a rod is less than 2 $\mu m$, preferably less than or equal to 1 $\mu m$.

It is understood that, when forming the electroluminescent rods, the height may be modified from one area of the light source to another, in such a way as to boost the luminance of the corresponding area when the average height of the rods forming it is increased. Thus, a group of electroluminescent rods may have a height, or heights, that are different from another group of electroluminescent rods, these two groups forming the same semiconductor light source comprising electroluminescent rods of submillimeter dimensions. The shape of the electroluminescent rods may also vary from one monolithic matrix array to another, in particular over the cross section of the rods and over the shape of the end face. The rods have a generally cylindrical shape, and they may in particular have a polygonal, and more particularly hexagonal, cross sectional shape. It is understood that it is important, for light to be able to be emitted through the circumferential wall, that the latter has a polygonal or circular shape.

Moreover, the end face may have a shape that is substantially planar and perpendicular to the circumferential wall, such that it extends substantially parallel to the upper face of the substrate, or else it may have a shape that is curved or pointed at its center, so as to increase the directions in which the light exiting from this end face is emitted.

The electroluminescent rods are arranged in a two-dimensional matrix array. This arrangement could be such that the rods are arranged in quincunx. Generally speaking, the rods are arranged at regular intervals on the substrate and the distance separating two immediately adjacent electroluminescent rods, in each of the dimensions of the matrix array, should be at least equal to 2 $\mu m$, preferably between 3 $\mu m$ and 10 $\mu m$, such that the light emitted through the circumferential wall of each rod is able to exit from the matrix array of electroluminescent rods. Provision is furthermore made for these separating distances, measured between two axes of elongation of adjacent rods, not to be greater than 100 $\mu m$.

According to another embodiment (not shown), the monolithic matrix array may comprise electroluminescent elements formed by layers of epitaxial electroluminescent elements, in particular a first layer of n-doped GaN and a second layer of p-doped GaN, on a single substrate, for example made of silicon carbide, and which is sliced (by grinding and/or ablation) to form a plurality of pixels respectively originating from one and the same substrate. The result of such a design is a plurality of electroluminescent blocks all originating from one and the same substrate and electrically connected so as to be able to be activated selectively from one another.

In one exemplary embodiment according to this other embodiment, the substrate of the monolithic matrix array may have a thickness of between 100 $\mu m$ and 800 $\mu m$, in particular equal to 200 $\mu m$; each block may have a width and a width, each being between 50 $\mu m$ and 500 $\mu m$, preferably between 100 $\mu m$ and 200 $\mu m$. In one variant, the length and the width are equal. The height of each block is less than 500 $\mu m$, preferably less than 300 $\mu m$. Finally, the exit surface of each block may be formed via the substrate on the side opposite the epitaxy. The separating distance between two pixels. The distance between each contiguous pixel may be less than 1 $\mu m$, in particular less than 500 $\mu m$, and is preferably less than 200 $\mu m$.

According to another embodiment that is not shown, both with electroluminescent rods extending respectively projecting from one and the same substrate, as described above, and with electroluminescent blocks obtained by slicing electroluminescent layers superimposed on one and the same substrate, the monolithic matrix array may furthermore comprise a layer of a polymer material in which the electroluminescent elements are at least partially embedded. The layer may thus extend over the entire extent of the substrate, or only around a given group of electroluminescent elements. The polymer material, which may in particular be silicone-based, creates a protective layer that makes it possible to protect the electroluminescent elements without impairing the diffusion of the light rays. Furthermore, it is possible to integrate, into this layer of polymer material, wavelength conversion means, and for example luminophores, that are able to absorb at least some of the rays emitted by one of the elements and to convert at least some of said absorbed excitation light into an emission light having a wavelength that is different from that of the excitation light. Provision may be made without distinction for the luminophores to be embedded in the mass of the polymer material, or else for them to be arranged on the surface of the layer of this polymer material.

The light source may furthermore comprise a coating of reflective material to deflect the light rays toward the exit surfaces of the pixelated source.

The electroluminescent elements of submillimeter dimensions define a given exit surface in a plane substantially parallel to the substrate. It will be understood that the shape of this exit surface is defined as a function of the number and the arrangement of the electroluminescent elements that form it. It is thus possible to define a substantially rectangular shape of the emission surface, it being understood that the latter may vary and adopt any shape without departing from the context of the invention.

The first lighting module of the lighting device thus makes it possible to perform the full or partial road lighting function, by projecting a light beam complementary to the cut-off beam generated by the third lighting module. The second module, for its part, projects a road writing beam, which will be superimposed on the high beam and on the cut-off beam. The at least partial superposition, along the vertical, of the high light beam and the ground writing beam makes it possible to increase the light intensity of the high beam, in particular in the center thereof, and therefore to improve the comfort of the driver and other road users. The at least partial superposition of the road writing beam with the cut-off beam makes it possible to write on the ground by virtue of the possible extra intensity, by driving the pixelated light source of the second module or by under-supplying the cut-off beam or even by turning off the relevant part of the cut-off beam if the third module comprises a pixelated light source, the pixels being able to be activated selectively.

Advantageously, the first and third beams overlap at least partially vertically.

Advantageously, the lighting device furthermore comprises a control unit able to selectively control the light intensity of each of the pixels of the second beam so as to project a pattern in the sub-beam formed by the combination of the second and third beams.

Advantageously, the sub-beam formed by the combination of the first and second beams has (when it is projected onto a screen 25 m away) an intensity maximum centered on the horizon line and a vertical axis through which the optical axis of the lighting device passes.

Advantageously, the first module is able to project a fourth pixelated partial high beam horizontally juxtaposed with the first pixelated partial high beam.

Advantageously, the second module is able to project a fifth pixelated partial high beam that at least partially overlaps or is horizontally juxtaposed with the first pixelated partial high beam.

Advantageously, the first and second modules are arranged such that the first beam is situated between the fourth and second beams or between the fifth and second beams.

Advantageously, the second module is arranged such that the second beam is able to overlap at least partially horizontally with the fourth pixelated partial high beam.

Advantageously, each pixelated beam has a vertical amplitude of at least 5° and a horizontal amplitude of at least 5°.

Advantageously, the resolution of the 1st beam is substantially identical to the resolution of the 4th beam.

Advantageously, the resolution of the 2nd beam is substantially identical to the resolution of the 5th beam.

Advantageously, the lighting device as claimed in one of the preceding claims, wherein the resolution of each of the 1st, 2nd, 4th and 5th beams is substantially identical.

The present invention furthermore proposes a motor vehicle comprising at least one lighting device according to the invention, preferably at least two.

Advantageously, each lighting device is arranged on either side of the motor vehicle, preferably on either side of the longitudinal axis of said vehicle.

BRIEF DESCRIPTION OF THE DRAWINGS

Other features and advantages of the invention will become apparent from the following description of several embodiments thereof, given by way of non-limiting example, with reference to the accompanying drawings in which.

DETAILED DESCRIPTION

Figure 1:
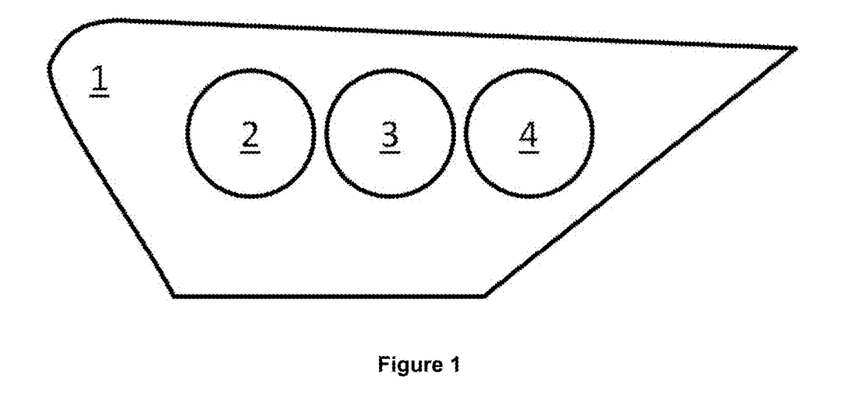
FIGS. 1 and 2 show front and plan views of a lighting device according to one preferred embodiment of the invention.
Figure 2:
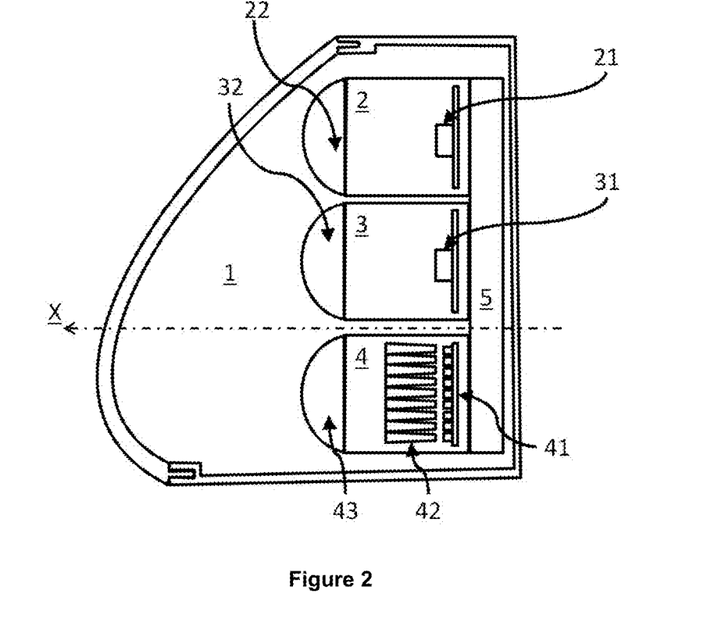

FIGS. 1 and 2 show, according to a first embodiment, a lighting device 1 according to one embodiment of the invention. This lighting device comprises a first lighting module 2 able to project a first pixelated partial or full high beam HR, a second lighting module 3 able to project a second road writing beam ER, and a third lighting module 3 able to project a third cut-off beam LB, such as a pixelated or non-pixelated low beam. The first, second and third beams HR, ER and LB have been shown in FIG. 3, projected onto a screen placed 25 meters from the lighting device 1 and on which have been formed a horizontal axis H-H representing the horizon and a vertical axis V-V, perpendicular to the horizontal axis H-H and intersecting the optical axis X of the lighting device 1.

The first module 2 comprises:
- a pixelated light source 21 comprising 1232 pixels, each pixel comprising at least one elementary emitter, arranged in a matrix array of 28 rows of pixels by 44 columns of pixels, each of the pixels being able to be activated selectively to emit an elementary light beam; and
- an optical projection element 22 associated with said pixelated light source for projecting each of said elementary light beams in the form of a pixel having a width and a length of 0.3°.

Figure 3:
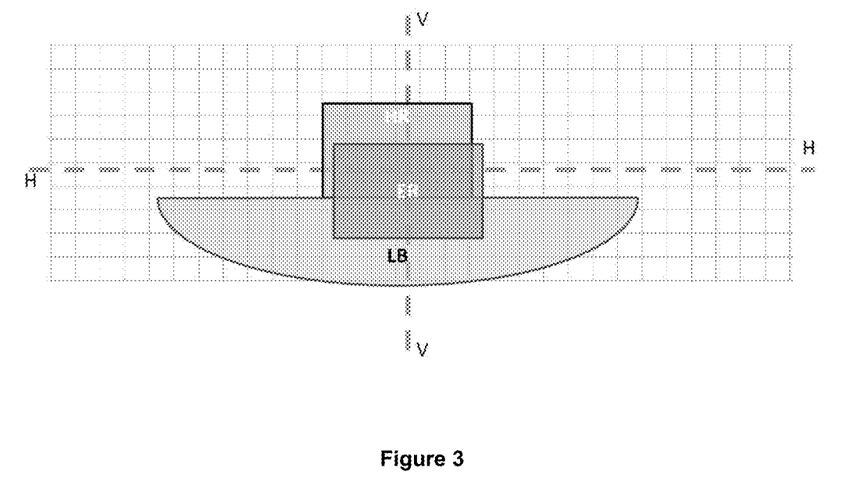
FIG. 3 is an overall beam projected by the lighting device according to a first embodiment.

The set of pixels projected by the first module 2 forms said first pixelated beam HR. This beam HR has a horizontal amplitude of 12° and a vertical amplitude of 9°. It extends asymmetrically on either side of the vertical axis V-V. In the present case, with the lighting device 1 being a right-hand headlight of the vehicle, the beam HR extends 4° on the interior-vehicle side and 8° on the exterior-vehicle side. It also extends 5° above the horizontal axis H-H and 3° below the horizontal axis H-H.

In the embodiment described, the pixelated light source 21 comprises a monolithic matrix array, as described above.

Provision may be made to replace the pixelated light source 21 with any other type of pixelated light source described above, such as for example a matrix array of light-emitting diodes or a light source associated with a matrix array of optoelectronic elements, such as micromirrors. The first lighting module may comprise elements other than those described above. These elements will not be described in the context of the present invention since they do not interact functionally with the arrangements according to the invention.

The third module 4 comprises:
- a light source 41 comprising a plurality of emitters, for example nine light-emitting diodes arranged along a row, each diode being able to emit an elementary light beam;
- a plurality 42 of primary optical elements arranged in front of the matrix array 41 for collecting, formatting and guiding the elementary light beams originating from each of the light-emitting diodes; and
- a projection optical element 43 arranged in front of the primary optical elements for projecting each of said elementary light beams originating from the primary optical elements in the form of a pixel having a width of 3° and a length of 5°.

In one variant of this embodiment, the nine light-emitting diodes are able to be activated selectively.

The set of pixels projected by the third module 4 forms the third beam LB. This beam LB has a horizontal amplitude of 20° and a vertical amplitude of 8°.

The third lighting module 3 is arranged such that the third low beam has a low-beam upper cut-off LB_CO. In the present case, the primary optical elements 42 are arranged such that their exit surfaces abut such that the lower edges of these surfaces are contiguous and aligned and the optical projection element 43 is focused on these exit surfaces. The optical projection element 43 thus images these lower edges at an upper cut-off LB_CO, defined by the upper edges of the pixels forming this third light beam.

In the example described, the upper cut-off comprises a single flat horizontal portion, arranged at 0.57° below the horizontal axis H-H.

The second module 3 comprises:
- a pixelated light source 31 comprising 1232 pixels, each pixel comprising at least one elementary emitter, arranged in a matrix array of 28 rows of pixels by 44 columns of pixels, each of the pixels being able to be activated selectively to emit an elementary light beam; and
- an optical projection element 32 associated with said pixelated light source for projecting each of said elementary light beams in the form of a pixel having a width and a length of 0.3°.

The set of pixels projected by the first module 2 forms said second pixelated beam ER. This beam ER has a horizontal amplitude of 12° and a vertical amplitude of 8°. It extends symmetrically on either side of the vertical axis V-V. In the present case, with the lighting device 1 being a right-hand headlight of the vehicle, the beam HR extends 6° on the interior-vehicle side and therefore 6° on the exterior-vehicle side. It extends asymmetrically 3° above the horizontal axis H-H and 5° below the horizontal axis H-H.

In the embodiment described, the pixelated light source 31 comprises a monolithic matrix array, as described above. Provision may be made to replace the pixelated light source 31 with any other type of pixelated light source described above, such as for example a matrix array of light-emitting diodes or a light source associated with a matrix array of optoelectronic elements, such as micromirrors. The first lighting module may comprise elements other than those described above. These elements will not be described in the context of the present invention since they do not interact functionally with the arrangements according to the invention.

The superposition of the various beams that are obtained is shown in FIG. 3. Thus the beams HR and ER, in particular at the intersection of lines H-H and V-V. The light intensity of the overall beam is thus increased, thus improving the visual comfort of the driver.

It is also seen that the beams ER and LB overlap. In terms of this superposition, several scenarios arise:
- the beam ER has a light intensity greater than that of the beam LB, and it is then possible to write on the ground through positive contrast so that this is seen by the driver and/or the other users;
- the beam LB is produced by a pixelated light source of the third module 4, the pixels of which are able to be addressed and activated individually, then the pixels of the beam LB of the area in common with the beam ER will be turned off to reveal the pattern produced by the beam ER.

Finally, the lighting device 1 comprises a control unit 5 each able to selectively control the light intensity of each of the pixels of the first and second beams HR and LB on the basis of control instructions that it receives, for example by switching on and by selectively switching off the elementary emitters of the light sources 21 and 31 or else by varying, in an increasing or decreasing manner, the electric power supplied to each of these elementary emitters.

In a second embodiment, the first module 2 is able to project a fourth pixelated partial high beam HR-CO horizontally juxtaposed with the first pixelated partial high beam HR. The first module 2 then comprises a second pixelated light source of the same type as the pixelated light source 21, that is to say comprising 1232 pixels, each pixel comprising at least one elementary emitter, arranged in a matrix array of 28 rows of pixels by 44 columns of pixels, each of the pixels being able to be activated selectively to emit an elementary light beam. An optical projection element is associated with said second pixelated light source of this first module 2 in order to project each of said elementary light beams in the form of a pixel having a width and a length of 0.3°.

The beam HR-CO has a horizontal amplitude of 12° and a vertical amplitude of 8°. In the present case, with the lighting device 1 being a right-hand vehicle headlight, the beam HR-CO extends 12° from the right-hand edge of the beam HR, that is to say from the edge of the exterior-vehicle side. It also extends 5° above the horizontal axis H-H and 3° below the horizontal axis H-H.

Figure 4:
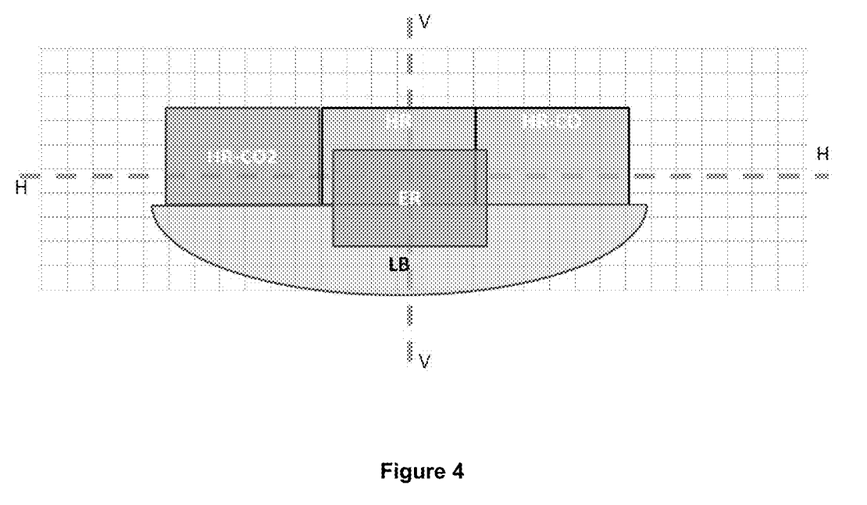
FIG. 4 is an overall beam projected by the lighting device according to a third embodiment.

In a third embodiment, this taking up the configuration of the second embodiment, the second module 3 is able to project a fifth pixelated partial high beam HR-CO2 at least partially overlapping or horizontally juxtaposed with the first pixelated partial high beam HR. This is illustrated in FIG. 4.

The second module 3 then comprises a second pixelated light source of the same type as the pixelated light source 31, that is to say comprising 1232 pixels, each pixel comprising at least one elementary emitter, arranged in a matrix array of 28 rows of pixels by 44 columns of pixels, each of the pixels being able to be activated selectively to emit an elementary light beam. An optical projection element is associated with said second pixelated light source of this second module 3 in order to project each of said elementary light beams in the form of a pixel having a width and a length of 0.3°.

The beam HR-CO2 has a horizontal amplitude of 12° and a vertical amplitude of 8°. In the present case, with the lighting device 1 being a right-hand vehicle headlight, the beam HR-CO extends 12° from the left-hand edge of the beam HR, that is to say from the edge of the interior-vehicle side. It also extends 5° above the horizontal axis H-H and 3° below the horizontal axis H-H of the interior-vehicle side.

In this configuration, there is limited bulk and a pixelated high beam that extends over the entire width of the cut-off beam LB in addition to the previous advantages.

A fourth embodiment is identical to the third embodiment except for the first module 2. This comprises:

a pixelated light source comprising 2464 pixels, each pixel comprising at least one elementary emitter, arranged in a matrix array of 28 rows of pixels by 88 columns of pixels, each of the pixels being able to be activated selectively to emit an elementary light beam; and an optical projection element associated with said pixelated light source for projecting each of said elementary light beams in the form of a pixel having a width and a length of 0.3°.

The set of pixels projected by the first module 2 forms a pixelated beam HR-D. This beam HR-D has a horizontal amplitude of 24° and a vertical amplitude of 9°. It extends asymmetrically on either side of the vertical axis V-V. In the present case, with the lighting device 1 being a right-hand headlight of the vehicle, the beam HR extends 4° on the interior-vehicle side and 20° on the exterior-vehicle side. It also extends 5° above the horizontal axis H-H and 3° below the horizontal axis H-H.

Figure 5:
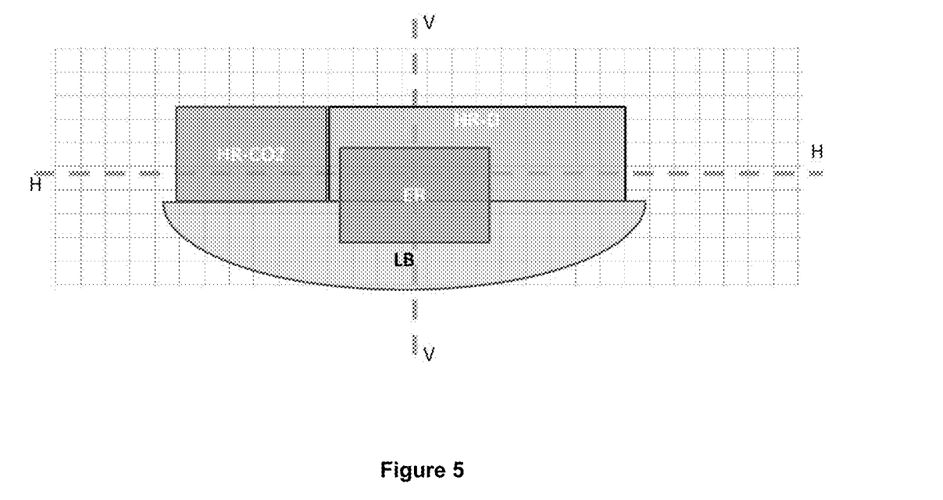
FIG. 5 is an overall beam projected by the lighting device according to a fourth embodiment.
Figure 6:
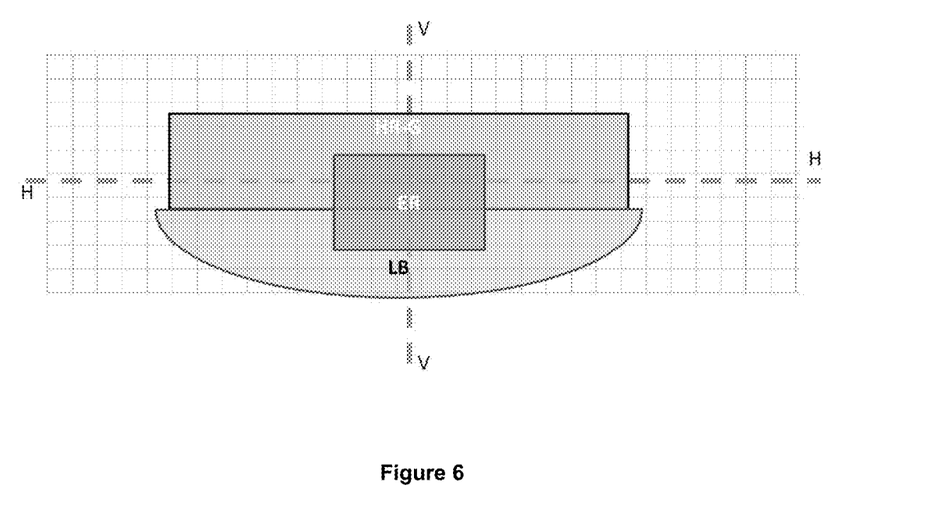
FIG. 6 is an overall beam projected by the lighting device according to a fifth embodiment.

The first module 2 is thus more compact, as is also therefore the lighting device 1 in comparison with the third embodiment. The various light beams that are obtained are illustrated in FIG. 5.

In a fifth embodiment, the first module 2 comprises:

a pixelated light source comprising 3696 pixels, each pixel comprising at least one elementary emitter, arranged in a matrix array of 28 rows of pixels by 132 columns of pixels, each of the pixels being able to be activated selectively to emit an elementary light beam; and an optical projection element associated with said pixelated light source for projecting each of said elementary light beams in the form of a pixel having a width and a length of 0.3°.

The set of pixels projected by the first module 2 forms the pixelated beam HR-G. This beam HR-G has a horizontal amplitude of 36° and a vertical amplitude of 9°. It extends asymmetrically on either side of the vertical axis V-V. In the present case, with the lighting device 1 being a right-hand headlight of the vehicle, the beam HR extends 16° on the interior-vehicle side and 20° on the exterior-vehicle side. It also extends 5° above the horizontal axis H-H and 3° below the horizontal axis H-H.

The first module 2 is thus more compact, as is also therefore the lighting device 1 in comparison with the third embodiment. The various light beams that are obtained are illustrated in FIG. 5.

The second and third modules remain identical to the first embodiment.

In one variant of the embodiments described above, the pixelated light sources may also have different resolutions from one another depending on the requirements needed.

It is understood that, in each of the cases of implementing a monolithic source according to the invention, it is thus possible, through the electrical connection of the electroluminescent elements that are distinct from the others or else through the shape of the slicing of the electroluminescent blocks, to achieve particular arrangements of the portions able to be activated selectively in the emission surface, whether in terms of their shapes or in terms of their dimensions.

As has been explained above, the substrate may be common to all of the electroluminescent elements forming the various portions of the monolithic matrix array. This thus optimizes the number of electrical connection wires, and makes it easier to bring together the portions of the light source, the contiguous nature of this arrangement being particularly beneficial for obtaining a homogeneous flow when both portions of the electroluminescent light source are activated simultaneously.

The above description clearly explains how the invention makes it possible to achieve the objectives that it has set for itself and in particular to propose a lighting device that makes it possible to achieve multifunction lighting at a lower cost, and without loss of photometric quality, that is to say lighting that makes it possible to produce a glare-free lighting function with cut-off, a long-range lighting function with a single shaping optic and a signaling function via writing on the road. It is particularly advantageous according to the invention to combine a monolithic source, and for example a semiconductor source comprising electroluminescent rods, and a simple shaping optic, that is to say by way of example a converging lens and/or a parabolic mirror, without the need for intermediate optical surfaces between these two elements.

Unless specified otherwise, the technical features that are described in detail for one given embodiment may be combined with the technical features that are described in the context of other embodiments described by way of example and without limitation.

What is claimed is:

1. A lighting device of a motor vehicle, comprising:
a first module configured to project a first pixelated partial or full high beam, and
a second module configured to project a second pixelated road writing beam, and
a third module configured to project a third cut-off low-beam, characterized in that the first, second and third modules are arranged such that the first and second beams overlap at least partially vertically; and
the second and third beams overlap at least partially vertically;
wherein each pixelated beam has a vertical amplitude of at least 5° (degrees) and a horizontal amplitude of at least 5° (degrees).

2. The lighting device as claimed in claim 1, further comprising a control unit configured to selectively control a light intensity of each of the pixels of the second beam so as to project a pattern in the sub-beam formed by the combination of the second and third beams.

3. The lighting device of claim 1, wherein the sub-beam formed by the combination of the first and second beams has a maximum intensity centered on a horizon line and a vertical axis through which an optical axis of the lighting device passes.

4. The lighting device of claim 1, wherein the first module is able to project a fourth pixelated partial high beam horizontally juxtaposed with the first pixelated partial high beam.

5. The lighting device of claim 4, wherein the second module is arranged such that the second beam is able to overlap at least partially horizontally with the fourth pixelated partial high beam.

6. The lighting device of claim 1, wherein the second module is able to project a fifth pixelated partial high beam that at least partially overlaps or is horizontally juxtaposed with the first pixelated partial high beam.

7. The lighting device of claim 1, wherein the first and second modules are arranged such that the first beam is situated between the fourth and second beams or between the fifth and second beams.

8. The lighting device of claim 1, wherein the resolution of the $1^{st}$ beam is substantially identical to the resolution of a $4^{th}$ beam.

9. The lighting device of claim 1, wherein the resolution of the $2^{nd}$ beam is substantially identical to the resolution of a $5^{th}$ beam.

10. The lighting device of claim 9, wherein the resolution of each of the $1^{st}$, $2^{nd}$, $4^{th}$ and $5^{th}$ beams is substantially identical.

11. An adaptive driving beam assembly that applies pixelated lighting of a motor vehicle, comprising:
- a first module configured to project a first pixelated partial or full high beam;
- a second module configured to project a second pixelated road writing beam; and
- a third module configured to project a third cut-off low-beam, characterized in that the first, second and third modules are arranged such that the first and second beams overlap vertically at least in a partial amount, and characterized in that the second and third beams overlap at least vertically at least in a partial amount.

* * * * *